US007072543B2

(12) United States Patent
Pierce et al.

(10) Patent No.: US 7,072,543 B2
(45) Date of Patent: Jul. 4, 2006

(54) EXTENDED SOURCE TRANSMITTER FOR FREE SPACE OPTICAL COMMUNICATION SYSTEMS

(75) Inventors: Robert M. Pierce, Longmont, CO (US); John A. Bell, Issaquah, WA (US); Carrie Sjaarda Cornish, Bellevue, WA (US); David Rush, Sammamish, WA (US)

(73) Assignee: Terabeam Corporation, Falls Church, VA (US)

( * ) Notice: Subject to any disclaimer, the term of this patent is extended or adjusted under 35 U.S.C. 154(b) by 258 days.

(21) Appl. No.: 10/681,552

(22) Filed: Oct. 7, 2003

(65) Prior Publication Data

US 2004/0071398 A1   Apr. 15, 2004

Related U.S. Application Data

(63) Continuation-in-part of application No. 10/128,953, filed on Apr. 22, 2002, now Pat. No. 6,810,175.

(51) Int. Cl.
*G02B 6/26* (2006.01)
*G02B 6/42* (2006.01)
(52) U.S. Cl. .................... 385/28; 385/33; 398/182; 398/200; 398/201
(58) Field of Classification Search ............... 398/182, 398/200, 201; 385/28, 33; 372/6
See application file for complete search history.

(56) References Cited

U.S. PATENT DOCUMENTS

| | | | | |
|---|---|---|---|---|
| 3,588,217 A | * | 6/1971 | Mathisen | 359/32 |
| 4,634,282 A | * | 1/1987 | Shaw et al. | 356/460 |
| 5,054,878 A | * | 10/1991 | Gergely et al. | 385/33 |
| 5,077,814 A | * | 12/1991 | Shigematsu et al. | 385/24 |
| 5,138,675 A | * | 8/1992 | Schofield | 385/28 |
| 6,061,133 A | * | 5/2000 | Freischlad | 356/460 |
| 6,548,796 B1 | * | 4/2003 | Silvermintz et al. | 250/201.3 |

* cited by examiner

*Primary Examiner*—Akm Enayet Ullah
*Assistant Examiner*—Daniel Petkovsek
(74) *Attorney, Agent, or Firm*—Blakely Sokoloff Taylor & Zafman LLP

(57) ABSTRACT

An apparatus for transmission of free space optical communication system signals employing a spatially-extended light source and method of using the same. A laser beam source directs an optical signal into a free end of a segment of multimode fiber. As the optical signal passes through the segment of multimode fiber, the optical signal is converted into a mode-scrambled optical signal. This mode-scrambled signal may then be used as a spatially-extended light source that is directed outward as an optical beam through the use of a collimating lens.

18 Claims, 8 Drawing Sheets

EXTENDED SOURCE TRANSMITTER FOR FREE SPACE OPTICAL COMMUNICATION SYSTEMS

CROSS REFERENCE TO RELATED APPLICATIONS

The present application is a continuation-in-part of U.S. patent application Ser. No. 10/128,953 filed Apr. 22, 2002, now U.S. Pat. No. 6,810,175, entitled "Off-Axis Mode Scrambler" by Jun Shan Wey et al., which is incorporated herein by reference. The present invention is also related to U.S. patent application Ser. No. 09/886,248 filed Jun. 20, 2001, entitled "Multimode Optical Signal Transmission in a Free-Space Optical Communication System" by Mark Lewis Plett.

FIELD OF THE INVENTION

The present invention generally relates to free-space optical communications systems (FSOCSs), and, more specifically, to a method and apparatus for increasing laser output power while maintaining compliance with eye safety standards.

BACKGROUND INFORMATION

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free-space and therefore do not require the routing of cables or optical fibers between locations. Thus, wireless optical communications are also known as free-space or atmospheric optical communications. For instance, in a FSOCS, a beam of light is directed through free-space from a transmitter at a first location to a receiver at a second location. Data or information is encoded into the beam of light, and therefore, the information is transmitted through free-space from the first location to the second location.

Transmission of optical signals through free space poses many challenges. Notably, atmospheric conditions can greatly degrade signal strength, and consequently, reduce the maximum link distances. Also, when launching a single-mode beam from a free-space optical terminal using conventional means, atmospheric scintillation and other wavefront distortion cause the beam to break up into chaotic bright and dark spots. Stated another way, such beams generally have non-uniform power distributions that vary on a timescale of milliseconds (corresponding to the transit time of wind passing through the free-space beam).

In some FSOCS applications, non-uniform power distributions far from the transmitter tend to undesirably limit the permissible overall power of the optical signal because the peak possible irradiance must meet specified eye safety standards. For example, some FSOCS applications must comply with specified laser classifications that address eye safety standards, such as the laser classifications defined by International Electrotechnical Commission (IEC) International Standard 60825-1: 1993+A1:1997+A2. To comply with the applicable standard(s), the power of the transmitted signals must be limited such that the peak possible irradiance received at a person's eye is maintained below the specified maximum value.

SUMMARY OF THE INVENTION

According to aspects of the present invention, an apparatus and method is provided for generating a FSOCS optical signal via a spatially-extended light source. In one embodiment, the spatially-extended light source is in the form of a mode-scrambled optical fiber light distribution and the transmitter employs single-aperture optics. An optical beam having a "top hat" intensity profile is produced, which provides several advantages. One of these advantages is the transmitter power for a given laser product classification may be increased while still satisfying peak irradiance limits defined for eye safety.

In one aspect of the invention, a spatially-extended light source is achieved by employing a laser beam source that directs a laser optical signal into one end of a first segment of multimode fiber comprising a graded-index (GI) fiber core. The first segment of multimode fiber is operatively coupled into a second segment of multimode fiber comprising a step-index (SI) fiber. As the laser optical signal passes through the first and second segments of multimode fiber, the optical signal is converted into a mode-scrambled optical signal having a substantially filled numerical aperture. This signal, in turn, is passed through a collimating lens and directed outward as a mode-scrambled optical beam.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 6a and 6b are schematic diagrams illustrating details of a laser beam that is directed toward a free end of a multimode fiber core, wherein FIG. 6a shows a centerline launch condition, and FIG. 6b shows an offset launch condition.

DETAILED DESCRIPTION OF PREFERRED EMBODIMENTS

Embodiments of an apparatus and method for generating mode-scrambled optical signals are described herein. In the following description, numerous specific details are disclosed to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
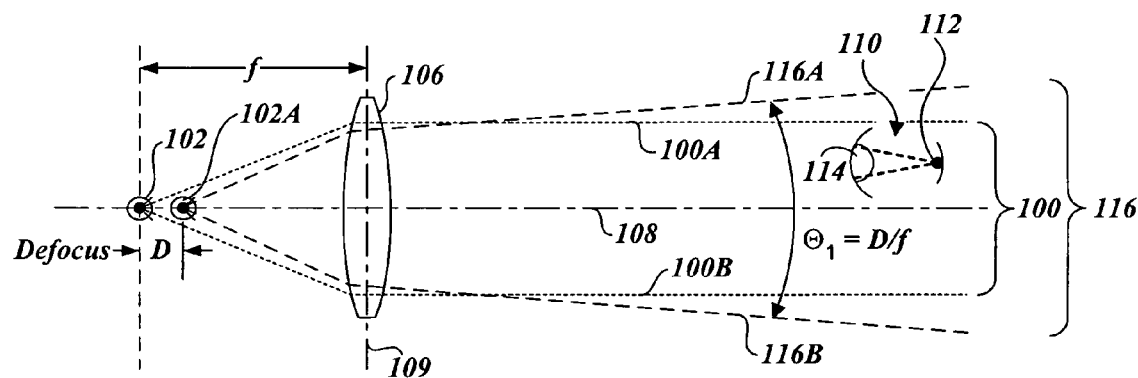
FIG. 1 is a schematic diagram illustrating the light-ray characteristics of a conventional FSOCS transmitter that employs a single point light source.

In order to better understand the eye-safety issue, reference is made to FIG. 1, which illustrates a typical light ray path that results from "single point" light source and collimating optics commonly employed in conventional FSOCS transmitters. FSOCS systems work by transmitting modulated laser light toward an optical receiver. Generally, transmitter and receiver components may be packaged separately, or may be combined in a transceiver head or terminal. Focus herein is directed toward the transmit aspect of an FSOCS transmitter or transceiver.

Ideally, a collimated optical signal 100 illustrated by light rays 100A and 100B would be employed to transmit data via the modulated laser. Collimated optical signals are analogous to a column of light, wherein the divergence Θ of the light rays is substantially 0 degrees. To achieve a collimated signal, a point light source 102 is placed at the focal point 104 of a collimating lens 106. The focal point 104 is located along the optical axis 108 of collimating lens 106 at a distance f from the primary principal plane 109 of the lens. Light corresponding to collimated optical signal 100 that is received by an eye 110 is focused on the eye's retina 112 via cornea and lens 114. Since the collimated light signal is emitted from a single point source, the source may be focused onto a very small area of the retina 112, potentially causing retinal damage if the maximum permissible exposure (as specified by the referenced laser safety standard) is exceeded.

In practice, purely collimated optical signals are not used in terrestrial FSOCS. One reason for this is that it is very difficult to align transmitters to receivers (since the beam spot area received at the receiver is so small). Instead, the single point optical source is moved toward the collimating lens to produce an output beam with a small amount of divergence. This is illustrated in FIG. 1 by a light source 102A, which is located on optical path 108 at a defocus distance D away from focal point 102. The resulting optical signal 116 is defined by light rays 116A and 116B. Neglecting the effects of diffraction, the angle of divergence, $\Theta_1$, is approximately equal to $DA/f^2$ where A is the lens aperture diameter. It is noted that angles and displacements are exaggerated in several of the drawing Figures herein for clarity—the actual angles of divergence are significantly smaller.

Although the optical signal now has a small amount of divergence, the optical source is still a single point source that can be sensed as such by the human eye, resulting in a similar potential for retinal damage. The net result is that divergent optical signal 116 still produces high peak irradiation. Furthermore, the location of the peak irradiation is unpredictable, as follows.

Figure 12A:
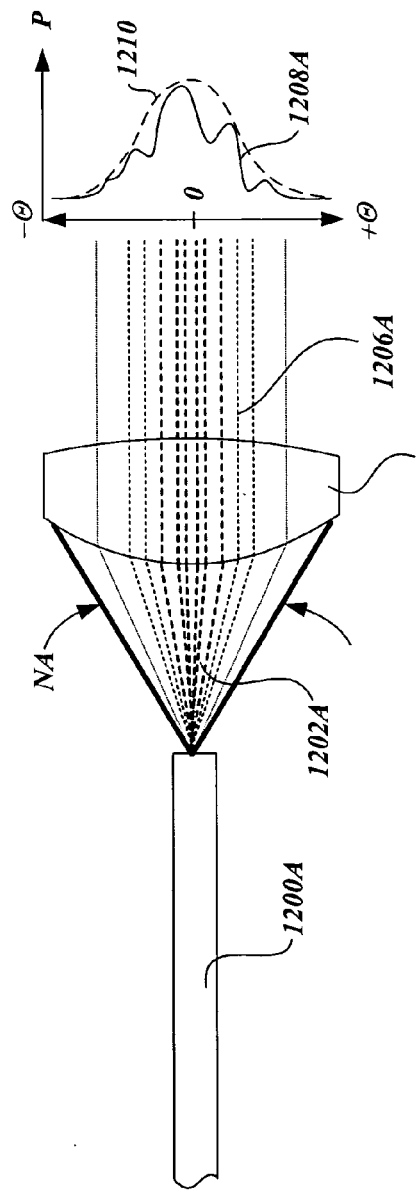
FIGS. 12a and 12b respectively show a mode-scrambled optical signal produced by using a prior art mode-scrambling technique that has an under-filled numerical aperture, and a mode-scrambled optical signal produced by an embodiment of the present invention in which the numerical aperture is substantially filled according to an embodiment of the present invention.

There is a dichotomy in FSOCS signal design. Designers often feel the need to produce high quality optical systems with "high quality" optical beams, which usually implies a Gaussian spatial distribution. Gaussian beams propagate in vacuum as eigenmodes, meaning their characteristic shape does not change with distance; these "ideal" beams are easily described in theory, but in practice the quality of the beam degrades as soon as it exits a finite transmitter. A beautiful Gaussian-like beam can quickly degenerate into a multimode spatial profile of the worst variety, with deep intensity nulls and high peaks that may vary in location and time as a function of air turbulence, density fluctuations and other phenomena, such as lens or window aberrations. An example of a deteriorated Gaussian beam profile is shown in FIG. 12a and discussed below.

Since it is not possible to prevent a "quality" beam from degrading in the atmosphere, the immediate question is this: can we purposely "scramble" the beam, complicating it to the point that atmospheric phenomena have a minimal influence on how the beam propagates? There are a number of ways of viewing this problem. One may view the vacuum eigenmodes as the most "orderly" solution, with one allowed state for a given beam size and divergence. However, the number of possible "disorderly" states is many times greater than one; it is much more likely that light will scatter or diffract from the orderly state into one of these disordered states. Once the light is in this disordered state, it will tend to scatter into another disordered state. The disordered nature of this model is analogous to the entropy model used in thermodynamics and other phenomena. It is highly unlikely that a disordered beam will scatter back into the Gaussian vacuum eigenmodes. The best beam to transmit in the atmosphere is the one that is disordered enough such that it always scatters into a new beam with equivalent entropy. Nevertheless, the beam must not be so disordered that it cannot be used in a practical optical link.

Ideally, the highest entropy beam would come from an extended, omnidirectional white light source, but such a source is not practical. One practical method for producing a high-entropy beam is to use a multimode, or spatially-extended light source created with light from a laser.

What is an extended light source? It first helps to understand "single mode" sources that are most often used for optical transmissions. A good example of a single mode source is light originating from a single mode fiber or from a single spatial mode diode laser. These sources are often referred to as "nearly" point sources. Beams derived from these point sources have a Gaussian-like intensity pattern. They can be tightly focused with a good lens (or the human eye). An extended source, on the other hand, is like many millions of single mode sources arrayed next to each other. An example of an extended source are light emitting diodes or light from a large core optical fiber, where the fiber mode power distribution is relatively uniform.

The present invention addresses the foregoing peak irradiance eye safety consideration by employing a spatially-extended light source, also referred to herein as an "extended source." The extended source is embodied in the form of a multi-mode fiber within which a large collection of separate modes are excited. The resulting mode-scrambled irradiance distribution yields an improved FSOCS transmission source compared to the conventional point source. These improvements include increasing the permissible transmitter power for a given laser product classification, reducing received power fluctuations under severe scintillation conditions, and other conditions and characteristics described below.

In one embodiment, light from a high modulation rate light source is spatially scrambled by appropriate means in large core optical fiber. The appropriate means may include a combination of fiber sizes and numerical apertures (NA), light launch conditions, scrambling elements, such as diffractive optical elements or lenslet arrays or random surface profile diffusers. The purpose of the scrambling is two-fold: (1) to increase the number of excited modes to complicate the optical beam enough that the effective spatial coherence is reduced, without adversely affecting the data rate, and (2) to "fill" the NA of the fiber to provide a consistent and repeatable optical source. "Filling" the NA of the fiber also increases the number of modes and provides a more uniform extended source.

The effect of this mode-scrambled light source is that light from what is effectively a point source (the laser) is converted into an extended source, one that emits light over a much broader aperture; the optical power, instead of arising from a single point source, is now distributed across an area that is considerably larger. The transmitted radiance (in units of power per unit area per unit solid angle) drops by the ratio of the areas of the diffraction limited "point" source to the fiber core area, so the radiance may drop by orders of magnitude. One result of this is that the minimum spot size of the extended source on the eye's retina is larger than that for a point source, and the peak irradiance (in units of power per unit area) within the focused spot is reduced.

For wavelengths in the range of 400 to 1400 nm, the maximum permissible exposure limit is primarily determined by irradiance and spot size at the retina. When the apparent angular extent, i.e., diameter, of an extended source exceeds 1.5 milli-radians (determined either with direct viewing conditions or by magnified viewing conditions depending on the specific laser classification) the permissible maximum power goes up as a result, allowing more power out of the aperture without compromising safety. A well-scrambled optical fiber extended source also approaches a top-hat shaped distribution, both in the irradiance at the tip of the emitting fiber core and in the far field irradiance pattern from the fiber emitter where a collimating lens would typically be placed, so the eye safety level increases as well from this uniform power distribution (as compared with a Gaussian-like power distribution).

Figure 2:
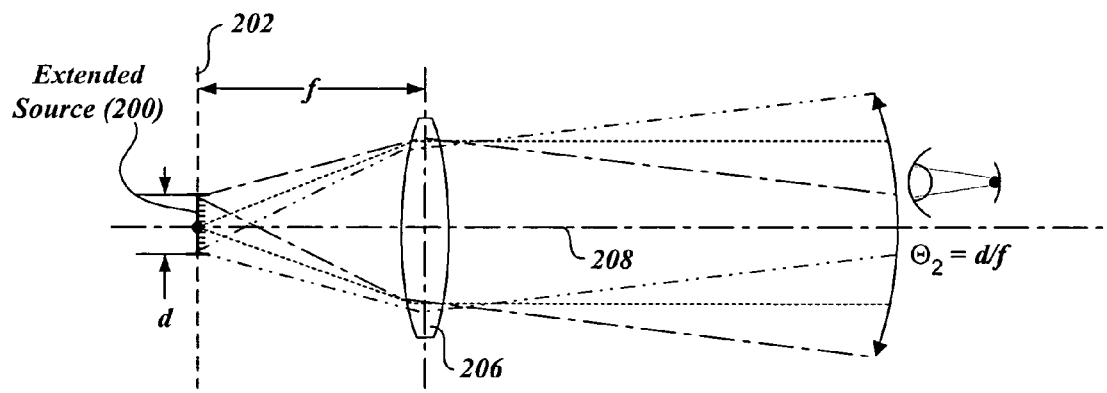
FIG. 2 is a schematic diagram illustrating the light-ray characteristics of an FSOCS transmitter that employs a spatially-extended light source that provides increased laser power/eye safety capability.

An extended source transmitter can be designed such that the divergence is minimized by locating the extended source in the focal plane of a single-aperture optical transmitter system. For example, FIG. 2 shows an embodiment in which a spatially-extended light source 200 is located in the focal plane 202 of a lens 206. The center of spatially-extended light source 200 is coincident with optical axis 208 of lens 206. The spot size of the extended source, in terms of its diameter, is d. The resultant diverging angle $\Theta_2$, is equal to d/f.

Locating the extended source in the focal plane is preferable to locating it along the optical axis 208 such that divergence is determined mainly by defocus, such as was the case in FIG. 1. The reason for this is because for a given divergence, the apparent angular subtense of the source (that accounts for the eye's ability to focus at different ranges) is maximized. Placing the fiber tip in the focal plane of the transmitter lens (e.g., lens 206) further simplifies the overall system design, since the effective source location is at infinity for all possible distances between the FSOCS terminals in a link. This can also simplify manufacturing since the divergence is less sensitive to the longitudinal placement of the fiber tip. This top hat irradiance distribution also means that the received power will fluctuate less as a result of vibrations on the transmitter.

One advantage of launching a spatially-extended light source signal comprising a mode-scrambled signal with a substantially-uniformly-filled numerical aperture is that a more powerful signal can be transmitted for a given classification of laser product. For example, the maximum amount of power used for a given optical signal due to eye safety concerns will generally be limited as a function of the power collected within a specific measurement aperture, (e.g. 7 mm diameter), rather than the integrated intensity of the signal (i.e., total signal power). Accordingly, the maximum power used for conventional signals for which the irradiance is not uniform across the emitting aperture will be limited by their peak intensities, which are often much more pronounced (relative to an average intensity) than that found in the top-hat profile produced by embodiments of the present invention, as presented below. As a result, the present invention enables more powerful optical signals to be transmitted, while still adhering to eye safety limitations.

Figure 3:
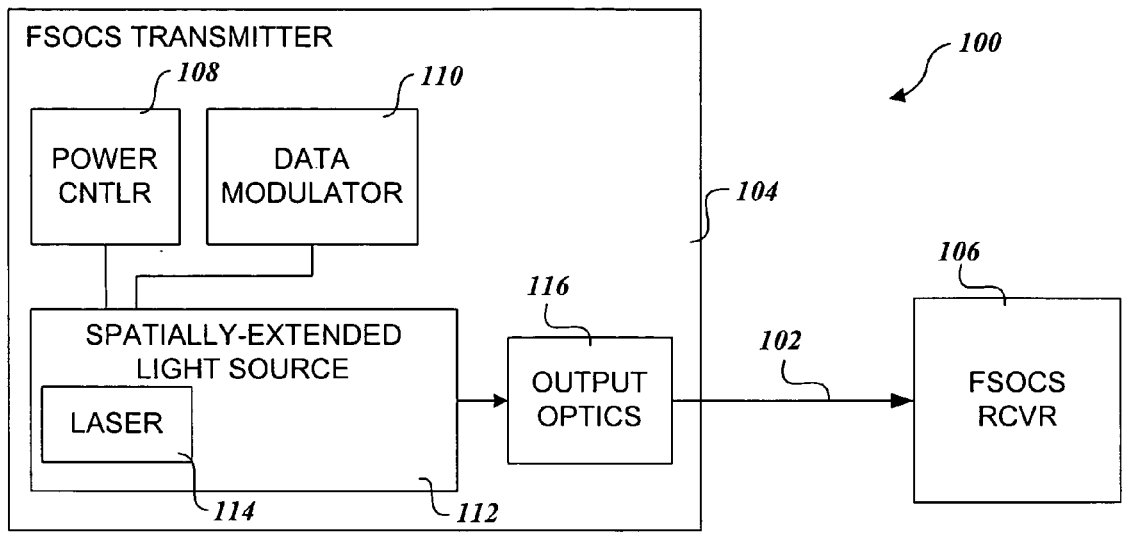
FIG. 3 is a functional block diagram of a FSOCS having a transmitter that employs a spatially-extended light source, according to one embodiment of the present invention.

FIG. 3 is a block diagram illustrating the primary components of an FSOCS 100 including an FSOCS transmitter with increased laser power/eye safety capability, according to one embodiment of the present invention. Under well-known practices, an FSO signal 102 is transmitted from a FSOCS transmitter 104 through the atmosphere and received at an FSOCS receiver 106. FSOCS transmitter 104 includes a power controller 108, a data modulator 110, a spatially-extended light source 112 including a laser 114, and output optics 116.

Figure 4:
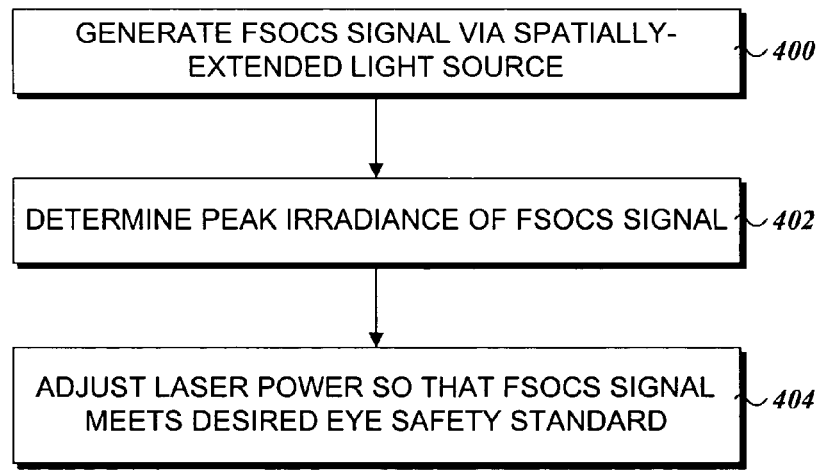
FIG. 4 is a flowchart illustrating a method of increasing laser power without exceeding the peak irradiance specified in an applicable eye safety standard, according to an embodiment of the present invention.

With reference to the flowchart of FIG. 4, FSOCS transmitter 104 is operated in the following manner to produce an optical signal having maximum power while still meeting an applicable eye safety peak irradiance limit. First, in a block 400, FSOCS signal 102 is generated through use of spatially-extended light source 112. In a block 402, a peak irradiance of the FSOCS signal 102 is determined. For example, the peak irradiance may be measured near the output optics 116. Photonic measurement devices, such as photometers and the like, may be used to determine the peak irradiance of the signal. The power supplied from power controller 108 to laser 114 is then adjusted in a block 404 so that the peak irradiance of FSOCS signal 102 remains below the threshold eye safety limit for the applicable laser class.

A laser light source can be converted into an extended source by a number of means. The simplest method is to insert a diffuser screen into the beam, but his method does not produce the type of source that is particularly useful. A better method is to fully populate modes in large core optical fiber. Fiber has the advantage that light emitted from it is constrained in angle to be within the fiber's NA so that the fiber may be matched to an optical transmitter telescope without much loss of total power. The fiber extended source, if made to have (substantially) uniform intensity, can then be used to produce a "top hat" power distribution from the transmit aperture, where all of the power from the fiber is transmitted in an optical beam with a well-defined divergence.

Figure 5:
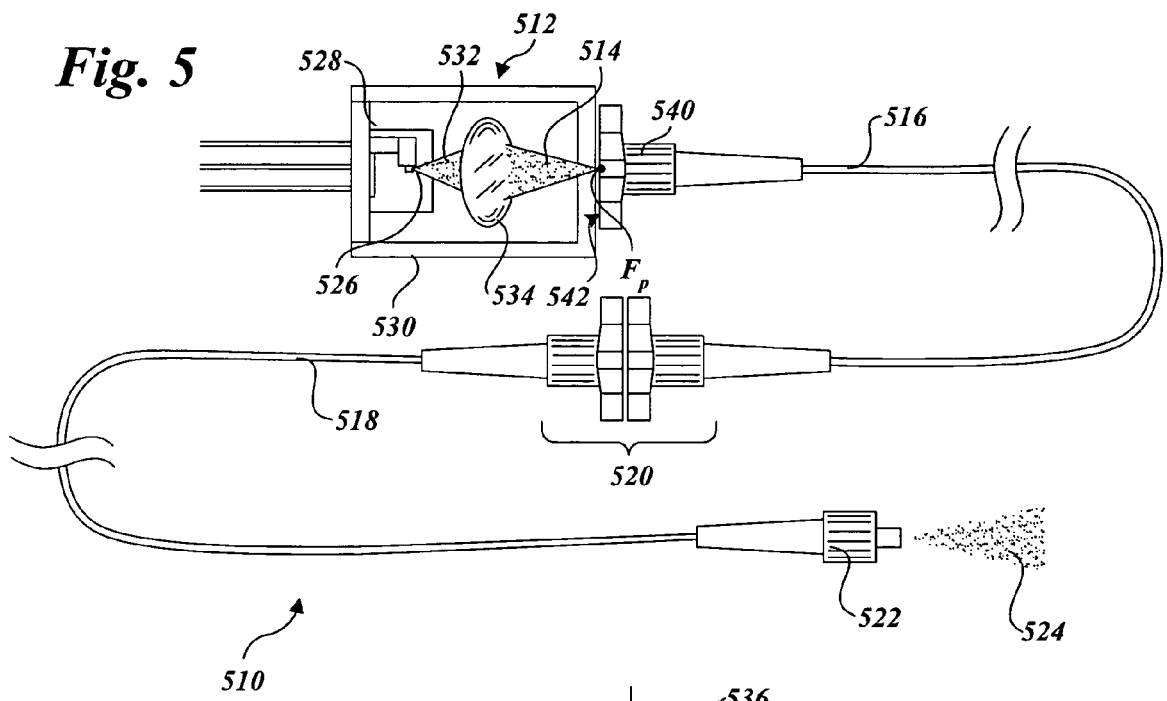
FIG. 5 is a schematic diagram of a mode scrambler in accordance with a first embodiment of the invention.

In accordance with further aspects of the invention, a mode scrambler may be employed to convert a laser-generated signal into a spatially-extended signal. For example, a mode scrambler 510 in accordance with one embodiment of the invention is shown in FIG. 5. In this embodiment, mode scrambler 510 includes a laser beam source 512 that directs a light beam 514 toward an input end of a segment of graded index (GI) multimode optical fiber 516. As used herein, the term "fiber" will generally refer to optical fiber, and the terms fiber and optical fiber are used interchangeably. GI multimode optical fiber segment 516 is coupled to a segment of step-index (SI) multimode optical fiber 518 via a fiber coupler 520. In one embodiment, GI multimode optical fiber segment 516 comprises a 62.5 micrometer (micron or μm) core, while SI multimode optical fiber segment 518 comprises a 200 μm core.

As the light beam 514 passes through GI multimode optical fiber segment 516, it begins to be scrambled into a plurality of modes. Upon passing through a GI multimode optical fiber-to-SI multimode optical fiber interface connector 520 and passing through SI multimode optical fiber segment 518, the original laser optical signal is emitted from a free end 522 of the SI multimode optical fiber segment as a mode-scrambled laser output 524.

In general, laser beam source 512 may comprise one of many types of laser beam sources that can produce a modulated laser beam. For example, laser beam source 512 includes a laser diode 526 mounted to a first face 528 of a housing 530. Laser diode 526 emits laser light 532, which is received by a focusing optical component 534. In one embodiment, focusing optical component 534 comprises a single optical lens. In another embodiment, as illustrated below in FIGS. 9 and 10, focusing optical component 534 comprises a set of optical lenses. In either case, the single or set of optical lenses is/are operatively coupled to housing 530 such that focusing optical component 534 is held in a fixed relationship to laser diode 526.

Figure 6A:
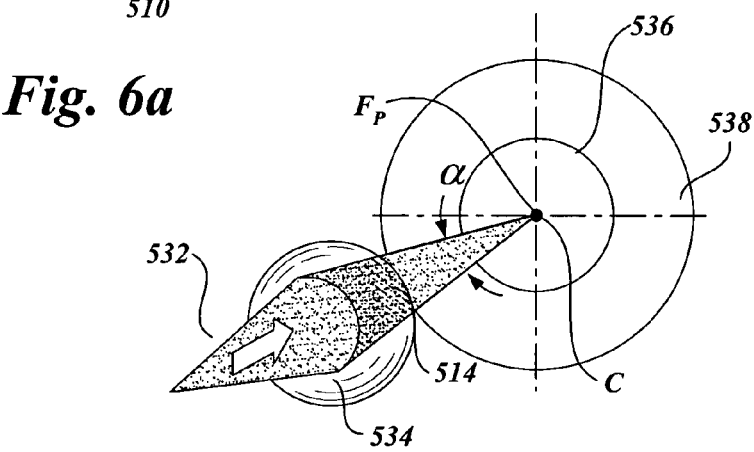
Figure 6B:
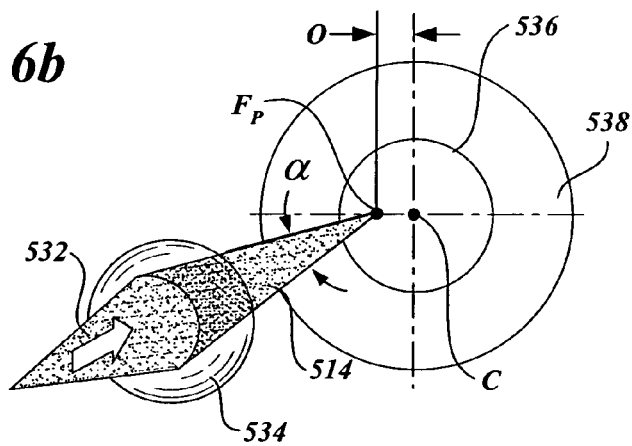

As further shown in FIGS. 6a and 6b, laser diode 526 and focusing optical component 534 are configured in a manner that results in a light beam 514 being directed toward a focal point $F_p$ that is substantially coincident with the fiber core 536 of the end face of GI multimode optical fiber segment 516. In the embodiment of FIG. 6a, the focal point $F_p$ of light beam 514 is substantially coincident with a centerline C of fiber core 536. Conversely, in the embodiment of FIG. 6b, the focal point $F_p$ of light beam 514 is offset from centerline C by an offset distance O. This generates an offset-launched optical signal that is received at the end of fiber core 536. In one embodiment, focusing optical component 534 is configured such that a convergence angle α of light beam 514 substantially matches the numerical aperture of fiber core 536.

As further depicted in FIGS. 6a and 6b, fiber core 536 is surrounded by cladding 538. In typical fibers, the fiber cladding is generally surrounded by a protective jacket, made of materials such as polymers. For illustrative purposes, the fiber core, cladding, and protective jacket are shown as a single structure in several of the Figures contained herein for clarity.

Returning to FIG. 5, in one embodiment, an end portion of GI multimode optical fiber segment 516 is held in a fiber mount 540, which is mounted to an end face 542 of housing 530 such that focal point $F_p$ is substantially coincident with the end of fiber core 536. In general, any suitable means for fixedly mounting the end of fiber core 536 such that it is substantially coincident with focal point $F_p$ may be used.

Figure 7:
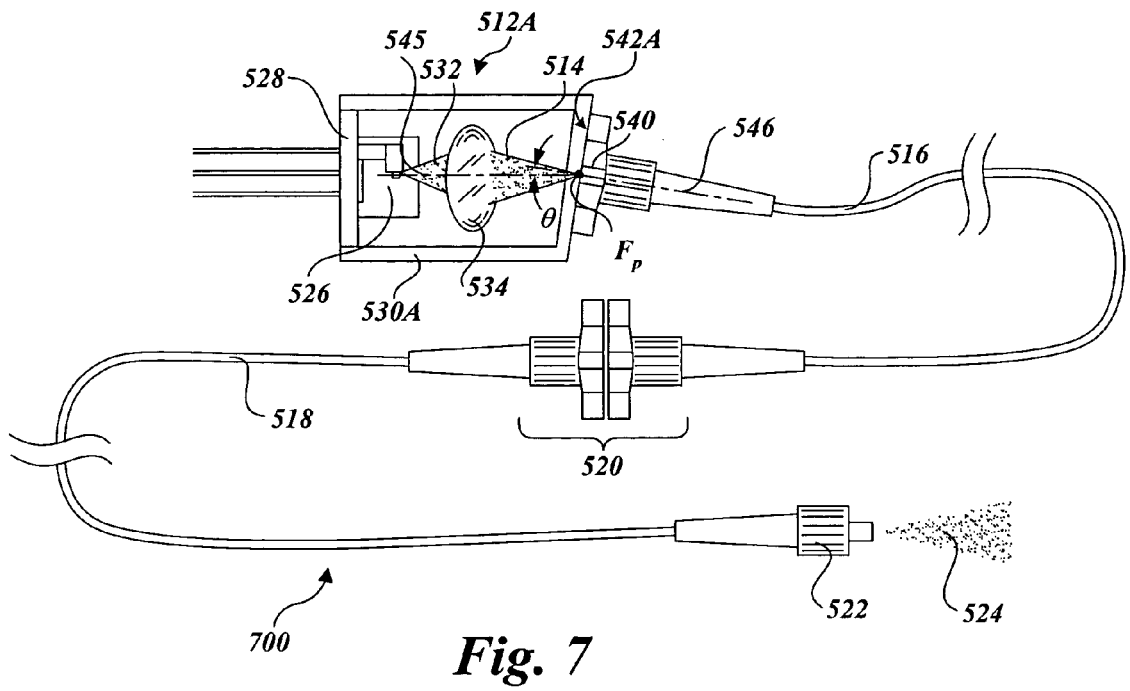
FIG. 7 is a schematic diagram of an offset mode scrambler in accordance with a second embodiment of the invention.

A mode scrambler 700 in accordance with another embodiment of the invention is shown in FIG. 7. In this configuration, light beam 514 is directed into fiber core 536 such that an acute angle θ is formed between respective centerlines 545 and 546 of the light beam and end portion of fiber core 536. The remaining components of mode scrambler 700 are substantially similar to like-numbered components discussed above with reference to mode scrambler 510. In the embodiment illustrated in FIG. 7, an end face 542A of a housing 512A is angled relative to centerline 545 such that it forms an angle of 90°—θ to the first end of GI multimode optical fiber segment 516. As further illustrated in FIG. 7, angle θ between centerlines 545 and 546 is created upon mounting fiber mount 540 to end face 542A.

The primary purpose of creating an acute angle between centerlines 545 and 546 is to substantially eliminate any portion of light impinging on the end of fiber core 536 from being reflected back toward laser diode 528. Since free space optical signals comprise a laser beam modulated at very high frequencies, it is desirable to minimize any signal degradation that might result from the reflected light. A secondary purpose for this angled fiber launch is to increase the portion of the fiber numerical aperture that is filled by light beam 514.

Figure 8:
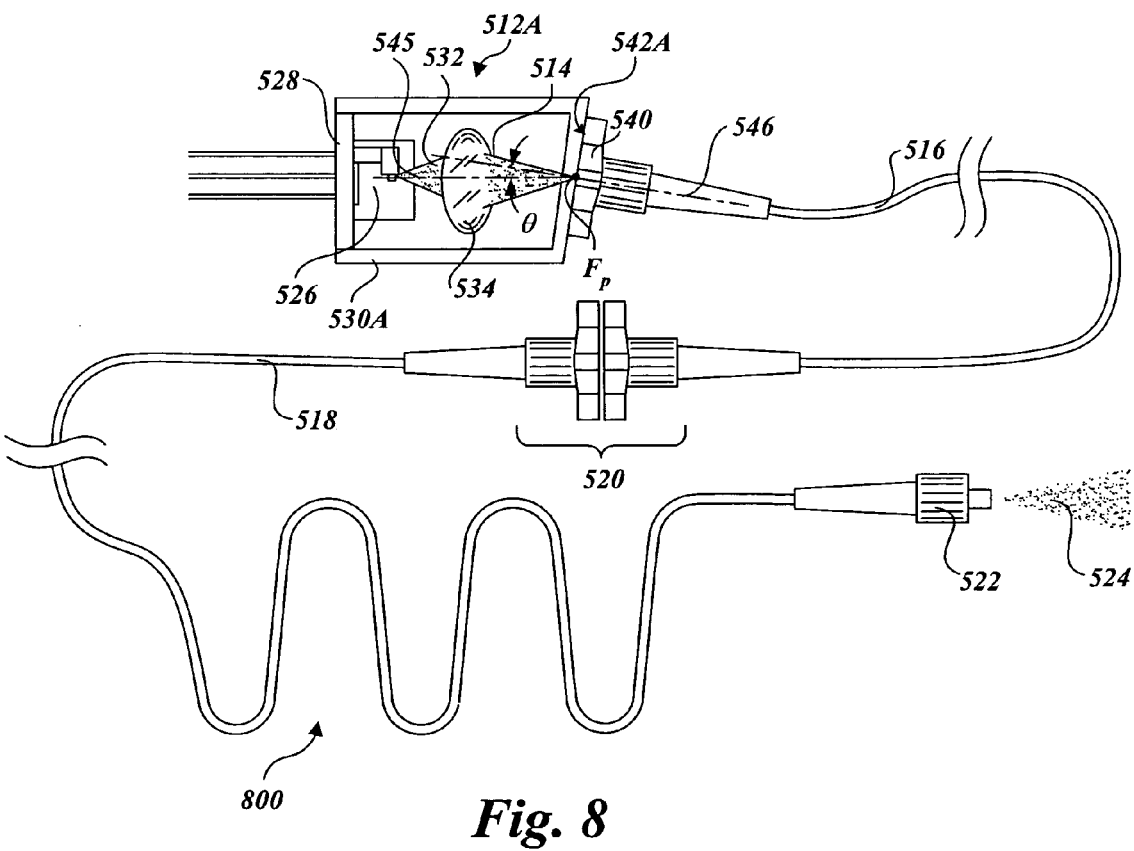
FIG. 8 is a schematic diagram of an offset mode scrambler in accordance with a third embodiment of the invention.
Figure 9:
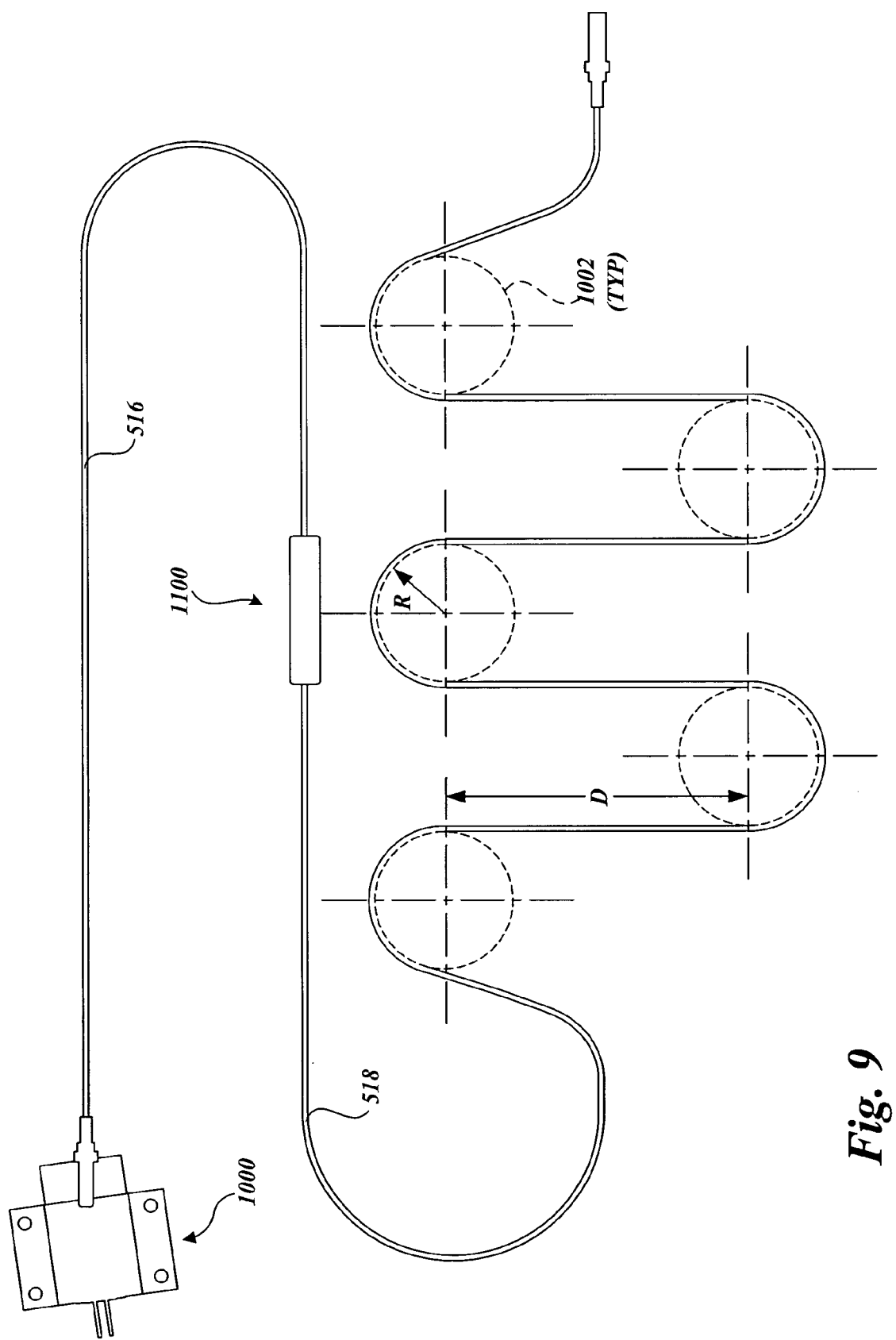
FIG. 9 is a schematic diagram illustrating details of a strain scrambler employed in the embodiment of FIG. 8.

An offset-axis mode scrambler 800 comprising a variation of mode scrambler 700 embodiment of the invention is illustrated in FIG. 8. In this configuration, a portion of SI fiber segment 518 is configured as a series of alternating loops. Further details of the alternating loops are shown in FIG. 9. In one embodiment, the alternating loops may be formed by wrapping a portion of SI fiber segment 518 around a plurality of rods 902 in an alternating manner. In general, the radius R of the loops should be large enough to not cause damage to the fiber. In one embodiment, the rods have a diameter of about ½ inch. Additionally, the horizontal distance D between adjacent rods is generally not critical.

Figure 10:
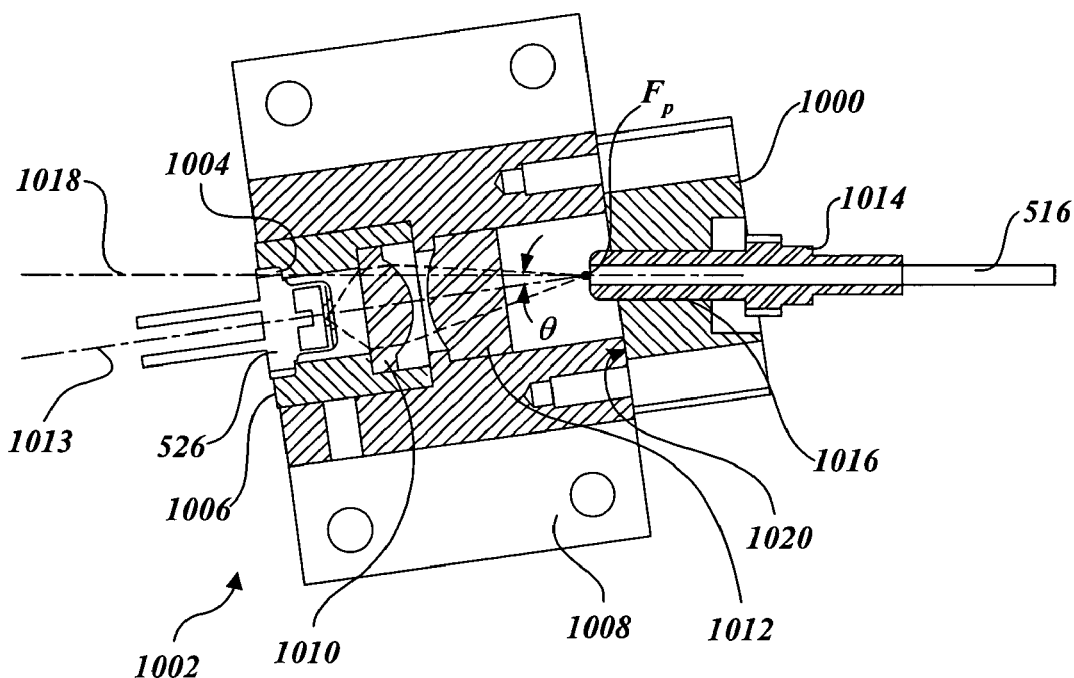
FIG. 10 shows a cross-section detail of an offset fiber mount and laser beam source in accordance with one embodiment of the invention.

Details of a fiber mount 1000 that is coupled to a laser beam source 1002 are shown in FIG. 10. The laser beam source includes a laser diode 526 that is mounted in a recess 1004 defined in a first end face 1006 of a housing 1008. In this embodiment, laser light emitted from laser diode 526 is collimated by a collimating lens 1010 and received by a focusing lens 1012, which directs the laser light substantially along a centerline 1013 toward a focal point Fp. An end portion of GI fiber segment 516 is mounted within a ferrule 1014 having a head portion disposed within a counterbored hole 1016 defined in fiber mount 1000. Counterbored hole 1016 is formed such that its centerline (coincident with a centerline 1018 of an end portion of GI fiber segment 516) forms a relative angle of θ between the centerline and a line perpendicular to face 1020 of fiber mount 1000.

Figure 11:
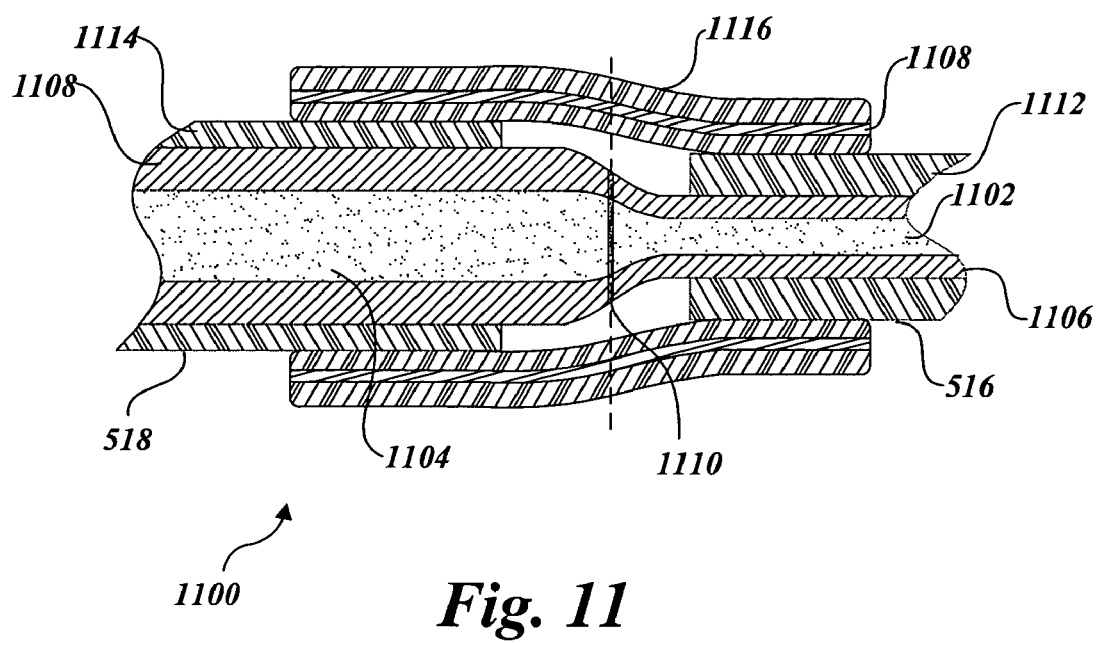
FIG. 11 shows a detailed cross-section of a fusion splice used to couple fiber segments having different core diameters, according to an embodiment of the present invention.

In one embodiment, GI multimode fiber segment 516 is coupled to SI multimode fiber segment 518 using a fusion splice. Details of an exemplary fusion splice 1100 are illustrated in FIG. 11. As shown in FIG. 11, in one embodiment, one end of 62.5 μm fiber core 1102 is spliced to one end of a 200 μm fiber core 1104. At the same time, cladding 1106 surrounding 62.5 μm fiber core 1102 and cladding 1108 surrounding 200 μm fiber core 1104 are also fused. The fused portions of the fiber cores and cladding are depicted as a fusion splice 1110. Prior to fusing the cores and surrounding cladding, an end portion of jackets 1112 and 1114 surrounding cladding 1106 and 1108, respectively, is stripped back, and the end of the fibers are cleaved. Heat is then applied while holding the ends of the fibers in contact with one another. In one embodiment, a protection sleeve 1116 may be used to protect the splice and the exposed cladding. In one embodiment, the protection sleeve comprises a plastic heat-shrink tube with a metal core 1118.

In general, the fibers in the fusion splice may have their centerlines co-aligned, as shown in the FIG. 11, or the centers may be offset. It is further noted that the fusion splice illustrated in FIG. 11 shows an idealized fusion splice; in actual practice, there will likely be a discontinuity between the two segments of fiber.

Additional Advantages of Launching a Mode-scrambled Optical Signal with a Substantially-filled Numerical Aperture As discussed above, the spatially-extended light source embodiments described herein create a mode-scrambled signal with a substantially filled numerical aperture. The numerical aperture is basically a measure of the light-gathering ability of the optical fiber and the ease in coupling light into the optical fiber. The numerical aperture is defined as the sine of the largest angle an incident light beam can have for total internal reflection in the core, and for SI multimode fiber is characterized by:

$$NA = \sin(\theta) = \sqrt{(n_1)^2 - (n_2)^2}$$

where NA is the numerical aperture, θ is the half angle of the incident light beam, $n_1$, is the index of refraction for the optical fiber core, and $n_2$ is the index of refraction for the optical fiber cladding.

Light rays launched within the angle specified by the optical fiber's numerical aperture excite optical fiber modes. The greater the ratio of core index of refraction to the cladding index of refraction results in a larger numerical aperture.

Figure 12B:
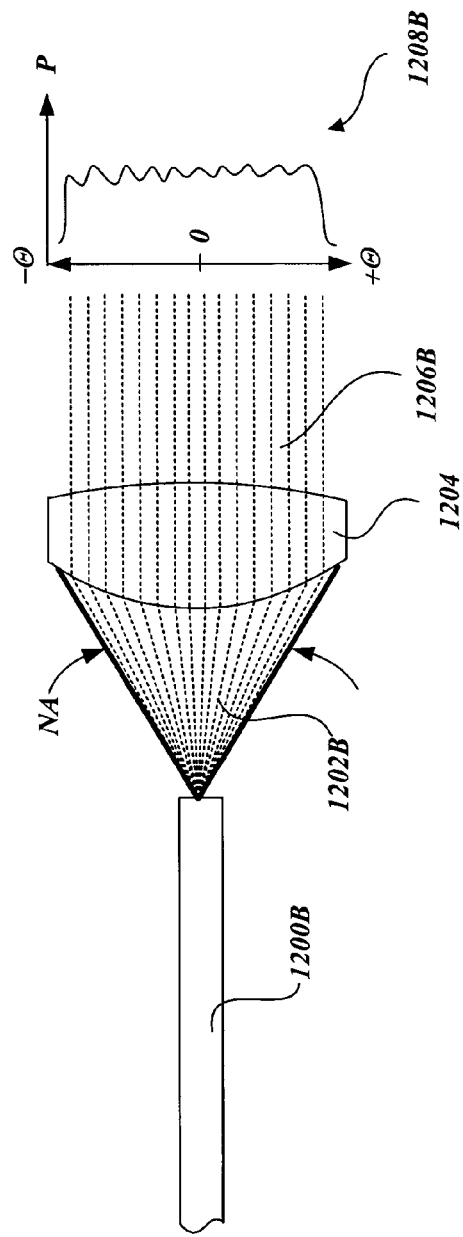

Launch conditions corresponding to an under-filled and substantially filled numerical aperture are illustrated in FIGS. 12*a* and 12*b*, respectively. In FIGS. 12*a* and 12*b*, optical signals 1202A and 1202B are respectively launched from segments of optical fiber 1200A and 1200B. As the optical signals impinge upon a collimating lens 1204, the signals are (substantially) collimated into respective transmitted signals 1206A and 1206B, which are received by a FSO terminal (not shown) to complete the link. In these Figures, the dashed lines illustrate relative intensity values, wherein the heavier the line, the greater the intensity.

At the right hand of each figure is an intensity distribution diagram that depicts the relative power distribution P of the optical signal vs. angle Θ relative to a centerline of the signal. In practice, the actual intensity distribution comprises a three-dimensional profile, with the two-dimensional profiles shown in FIGS. 12*a* and 12*b* being for illustrative purposes.

FIG. 12*a* illustrates two intensity distributions 1208A and 1210. Intensity distribution 1210 is illustrative of a theoretical Gaussian profile. As discussed above, the conventional single-point launch produces a Gaussian-like profile at the launch point (i.e., exiting the launch fiber); as the optical signal traverses the atmosphere and/or passes through optics and windows, uneven optical effects cause distortion to the Gaussian curve, which are illustrated in intensity distribution 1208A. Generally, the peak intensity will be located near the center of the profile, although the encountered optical effects may cause it to be offset.

In contrast, the signal intensity profile produced by embodiments of the present invention, as illustrated by an intensity distribution 1208B, is in the shape of a "top hat," which is a desirable intensity distribution for optical communication. For example, one advantage of the "top hat" intensity distribution is that, for a given safety classification of laser product, it allows for more energy to be transmitted out of the transmit aperture than the Gaussian distribution characteristic of a single mode transmission, or large peak and valley profile common to prior art mode-scrambled signals.

Another advantage of launching a mode-scrambled signal with a substantially-filled numerical aperture is that the optical signal is pre-distorted such that effects such as atmospheric scintillation and/or window wave front aberration are small compared to the scrambling generated on the transmitting end. This means that the light beam power distribution at the receiving aperture is more homogenous and the intensity fluctuations caused by atmospheric scintillation and/or window wave front aberration are practically transparent.

A top hat intensity, extended source distribution is an improvement over a Gaussian distribution for the additional following reasons:

(1) The Gaussian vacuum eigenmode can never be allowed to fill the exit aperture because intermediate field diffraction effects (Fresnel diffraction) will produce unmanageable diffraction maxima and minima; the Gaussian mode field diameter must be much less than the clear aperture of the optical system. Such beams also focus with high brightness on the retina. In contrast, a top hat beam, specifically from an extended source, has a certain amount of natural divergence and can also "fill" the exit aperture without excessive loss and without concentrating the power in the center of the aperture. The eye safety power limit is greater as a result of this combination of filling the aperture and extended source divergence. The filled aperture distributes the power more evenly, lowers the radiance, and the extended source divergence reduces the focused irradiance at the eye's retina. An extended source that has a nearly top hat shape that fills the exit aperture will greatly increase the total eye-safe power out of the aperture without resulting in noticeable Fresnel diffraction effects.

(2) The Gaussian vacuum eigenmode is not an eigenmode of the FSOCS optical system and is not an appropriate choice. Considering the entire communication link as the optical system (including air turbulence, window aberrations, etc.) requires one to recognize that the Gaussian eigenmodes will never be the appropriate choice. The practical eigenmode is one that does not significantly change as it propagates across the link. An extended source produces a beam that is significantly the same from one end of the link to the other (provided the link is not excessively long or the transmit aperture is not excessively small.) This top hat pseudo-eigenmode is essentially unaltered by atmospheric turbulence or window aberrations (unless the aberrations are so severe that one can see the aberrations or turbulence, such as mirage effects, with the naked eye.)

(3) When the light source is from a single mode fiber, the power distribution has a bell shape that is approximately Gaussian. This smooth shape is compromised with any modest number of scratches or dust on the fiber tip. Alternatively, light directly from a laser diode facet is elliptical and, from one laser to the next, this elliptically can vary by several degrees of divergence. An extended source allows one to build an optical system that does not need to compensate for the vagaries of these light sources, since variations between different light sources are lost in the mode-scrambling. It is therefore possible to make a simpler optical design and improve the manufacturability of the total FSOCS.

(4) A larger transmit divergence in FSOCS translates into reduced tracking requirements, but also geometric power loss at the receiver. While not a complete solution to this problem, increasing the transmit divergence using extended sources also allows some of the power loss to be reduced since higher powers are allowed out of the transmit aperture.

(5) Lowering tolerances on laser sources allows the use of lower cost lasers and components.

(6) Using large core optical fiber in the extended source allows the optical head to be de-coupled from the electronics in the mechanical assembly. This promotes modularity of design, which has obvious advantages.

Figure 13:
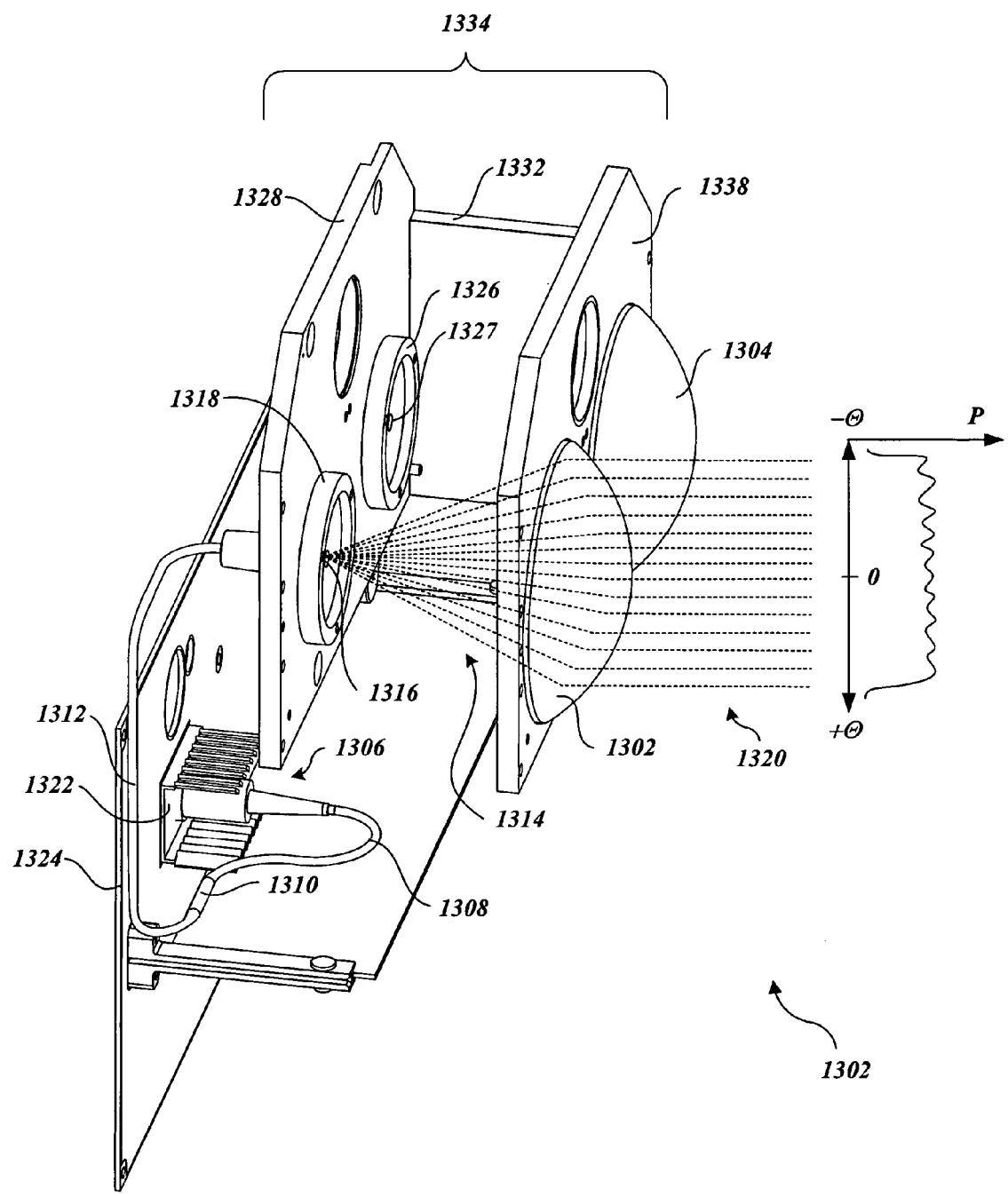
FIG. 13 is an isometric view of an exemplary FSOCS transceiver that employs a spatially-extended light source in accordance with one embodiment of the invention.

An exemplary FSOCS transceiver 1300 that employs spatially-extended transmitter elements discussed above is shown in FIG. 13. FSOCS transceiver 1300 employs a binocular configuration including a transmit optic 1302 and a receive optic 1304. A laser beam source assembly 1306 generates laser light that is launched into a first end of an Si fiber segment 1308. After traversing the Si fiber segment, the light passes through a coupling 1310 that couples the Si fiber segment to a GI fiber segment 1312. The light then passes through GI fiber segment 1312, which excites a large number of modes, resulting in mode-scrambled light 1314 exiting an exit fiber end 1316 of GI fiber segment 1312. The exit fiber end 1316 is held by a fiber mount 1318. As mode-scrambled light 1314 impinges on transmit optic 1302, it is collimated into a mode-scrambled optical beam 1320, which is transmitted to be received at a receiver optic 1304 on another transceiver (not shown).

In the illustrated embodiment, laser source 1306 includes a laser (not shown) mounted to a heat sink 1322, which, in turn, is mounted to a circuit board 1324. Fiber mount 1318 and a fiber mount 1326 in which the receive end 1327 of a receiver fiber (not shown) are coupled to a plate 1328. Transmit and receive optics 1302 and 1304 are coupled to a plate 1330. Plates 1328 and 1330 are coupled via a rear cross-plate 1332 and mid and front cross plates (both removed for clarity), thereby forming a frame assembly 1334.

All of the illustrated components of FSOCS transceiver 1300 are mounted within a housing, which is not shown for clarity. Under a typical use, the housing is mounted to a support member, or is otherwise operatively coupled to a building member (e.g., wall or floor). Typically, respective FSOCS are mounted in offices of buildings that are within line-of-sight of one another, wherein the optical signals are transmitted through building windows. Optionally, one or both of the transceivers may be mounted on the exterior of a building.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and Figures are accordingly to be regarded as illustrative rather than restrictive. Furthermore, it is not intended that the scope of the invention in any way be limited by the above description, but instead be determined entirely by reference to the claims that follow.

What is claimed is:

1. A free-space optical communication system (FSOCS) transmitter, comprising:
   a spatially-extended light source including a laser to generate a mode-scrambled optical signal, the spatially extended light source further including a segment of multimode fiber having a first end positioned to receive a laser optical signal produced by the laser and a second end from which a mode-scrambled optical signal is emitted and wherein a portion of the segment of multimode fiber is configured in a series of alternating loops;
   a power controller, operatively coupled to drive the laser; and
   output optics, optically coupled to receive the mode-scrambled optical signal from the spatially-extended light source and direct the mode-scrambled optical signal outward from the FSOCS transmitter as an optical beam having a controlled divergence.

2. The apparatus of claim 1, wherein the end of the segment of multimode fiber is operatively coupled to the laser so as to produce an offset-launched optical signal.

3. The apparatus of claim 1, wherein the segment of multimode fiber consists of two or more separate pieces of multimode fiber that are joined together to be a continuous single strand.

4. The apparatus of claim 3, wherein there are two joined segments of multimode fiber wherein the first segment of multimode fiber comprises a 62.5 micron graded-index core, and the second segment of multimode fiber comprises a 200 micron step-index core.

5. The apparatus of claim 3, wherein the two or more segments of multimode fibers are operatively coupled together using one or more fusion splices.

6. The apparatus of claim 1, wherein the laser optical signal converges or diverges at an angle that substantially matches a numerical aperture of the multimode fiber.

7. The apparatus of claim 1, wherein the mode-scrambled optical signal has a power intensity distribution that has a shape substantially similar to a top hat.

8. The apparatus of claim 1, wherein an output of the spatially-extended light source is located coincident with a focal plane of a collimating lens comprising the output optics.

9. The apparatus of claim 1, further comprising a data modulator operatively coupled to the spatially-extended light source, the data modulator to modulate the optical beam.

10. The apparatus of claim 1, wherein the optical beam has a wavelength from 400 to 1400 nanometers.

11. A method for generating a free space optical communication system (FSOCS) signal, comprising:

producing a mode-scrambled modulated optical signal with a spatially-extended light source by:

operatively coupling a segment of multimode fiber configured in a series of alternating loops; and directing an optical signal produced by a laser to the first end of the segment of multimode fiber to generate a launched optical signal that is received by the first segment of multimode fiber;

wherein, as the launched optical signal passes through the segment of multimode fiber, it is converted into a mode-scrambled optical signal that serves as a spatially extended light source;

passing the modulated optical signal through a collimating lens to output an optical beam comprising the FSOCS signal.

12. The method of claim 11, wherein the segment of multimode fiber consists of two or more separate pieces of multimode fiber, with possibly differing core sizes and index profiles, that have been joined together to form a continuous single strand.

13. The method of claim 12, wherein there are two joined segments of multimode fiber wherein the first segment of multimode fiber comprises a 62.5 micron graded-index core, and the second segment of multimode fiber comprises a 200 micron step-index core.

14. The method of claim 11, wherein the optical signal is directed towards the first end of the segment of multimode fiber such that it is received at an offset angle relative to a centerline of an end portion of the segment of multimode fiber.

15. The method of claim 11, further comprising focusing the optical signal into an end of the segment of multimode fiber such that the optical signal is launched into the end at a point that is offset from a centerline of the multimode fiber.

16. The method of claim 11, further comprising focusing the optical signal such that it converges at an angle that substantially matches a numerical aperture of the segment of multimode fiber.

17. A free-space optical communication system (FSOCS) transmitter, comprising:

means for generating a spatially-scrambled optical signal that functions as an extended light source, wherein the means for generating a spatially-scrambled optical signal comprises an optical fiber segment configured in a series of alternating loops; and focusing means, positioned to receive the spatially-scrambled optical signal that is generated and direct the spatially-scrambled optical signal outward from the FSOCS transmitter as a spatially-scrambled optical beam.

18. The FSOCS transmitter of claim 17, wherein the means for generating a spatially-scrambled optical signal comprises:

lasing means for generating a light signal; and means for converting the light signal into a mode-scrambled signal.

* * * * *